United States Patent
Ko et al.

(10) Patent No.: US 8,190,209 B2
(45) Date of Patent: May 29, 2012

(54) APPARATUS AND METHOD FOR BEAMFORMING IN A MULTIANTENNA MULTIUSER COMMUNICATION SYSTEM

(75) Inventors: Eun-Seok Ko, Seongnam-si (KR);
Jong-Hyung Kwun, Seongnam-si (KR);
David Mazzarese, Suwon-si (KR);
Chan-Byoung Chae, Austin, TX (US);
Robert W. Heath, Jr., Austin, TX (US)

(73) Assignees: Samsung Electronics Co., Ltd., Suwon-si (KR); Board of Regents, The University of Texas System, Austin, TX (US)

( * ) Notice: Subject to any disclaimer, the term of this patent is extended or adjusted under 35 U.S.C. 154(b) by 503 days.

(21) Appl. No.: 12/383,143

(22) Filed: Mar. 20, 2009

(65) Prior Publication Data
US 2009/0253380 A1    Oct. 8, 2009

(30) Foreign Application Priority Data

Mar. 20, 2008 (KR) .................. 10-2008-0026081

(51) Int. Cl.
*H04B 1/38* (2006.01)

(52) U.S. Cl. ......................................... 455/561
(58) Field of Classification Search .................. None
See application file for complete search history.

(56) References Cited

U.S. PATENT DOCUMENTS

| 7,139,328 | B2 * | 11/2006 | Thomas et al. | 375/299 |
| 2007/0098106 | A1 * | 5/2007 | Khojastepour et al. | 375/267 |

* cited by examiner

*Primary Examiner* — Lincoln Donovan
*Assistant Examiner* — Sibin Chen

(57) ABSTRACT

A method for beamforming by a transmission device in a multiantenna multiuser communication system. The method includes grouping codebook indexes included in a codebook into codebook index combinations, and calculating a sum of transmission rate for each of the codebook index combinations; selecting a codebook index combination with a maximum sum of transmission rate as an optimal codebook index combination; and transmitting a codebook index corresponding to a particular reception device among codebook indexes included in the optimal codebook index combination, to the particular reception device.

12 Claims, 3 Drawing Sheets

APPARATUS AND METHOD FOR BEAMFORMING IN A MULTIANTENNA MULTIUSER COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Mar. 20, 2008 and assigned Serial No. 10-2008-0026081, the disclosures of which are incorporated herein by reference.

TECHNICAL FIELD OF THE INVENTION

The present invention relates to an apparatus and method for beamforming in a multi-antenna multiuser communication system.

BACKGROUND OF THE INVENTION

Pre-coding and post-processing used by a transmission device of a multi-antenna multi-user communication system are classified into liner types and nonlinear types. The linear pre-coding can be subdivided into unitary pre-coding and non-unitary pre-coding. Coordinated beamforming belongs to non-unitary pre-coding.

In coordinated beamforming, a transmission device calculates pre-coding matrices and receive beamforming vectors (or receive beamforming matrices) using downlink channel information to all active users. The pre-coding matrices and the receive beamforming vectors are calculated using an iteration algorithm so that inter-user interference may be minimized. The inter-user interference is also known as multiple-access interference.

Coordinated beamforming uses the following two methods to calculate transmit/receive beamforming vectors.

In a first method, using pilot beamforming, a transmission device allocates dedicated pilots to respective reception devices. Thereafter, the transmission device beam-forms dedicated pilots as receive beamforming vectors for reception devices and transmits them. Each of the reception devices estimates an effective channel using the dedicated pilot, forms a matched filter on the estimated effective channel, and uses it as a receive beamforming vector.

In a second method, a transmission device quantizes receive beamforming vectors for respective reception devices and transmits them to the reception devices over a feedforward channel. One of the two methods is selected depending on whether or not the multiantenna multiuser communication system uses dedicated pilots.

Meanwhile, since coordinated beamforming uses an iteration algorithm that converges pre-coding vectors and receive beamforming vectors on a value at which user interference is minimized, its calculation is given as a random variable. Therefore, signal transmission by the transmission device may be delayed until calculation of transmit/receive beamforming vectors has converged. On the other hand, when iteration of the iteration algorithm is restricted by compulsion, the transmit/receive beamforming vectors may be calculated incorrectly, causing a reduction in performance.

In addition, after calculating the transmit/receive beamforming vectors using the iteration algorithm, coordinated beamforming must go through two steps of quantizing receive beamforming vectors using a codebook, and readjusting the transmit beamforming vectors using the quantized receive beamforming vectors. Therefore, in some cases performance may be degraded due to the quantization.

SUMMARY OF THE INVENTION

To address the above-discussed deficiencies of the prior art, it is a primary object of the present invention to address at least the problems and/or disadvantages and to provide at least the advantages described below. Accordingly, an aspect of the present invention is to provide an apparatus and method for beamforming in a multi-antenna multi-user communication system.

Another aspect of the present invention is to provide an apparatus and method, wherein a reception device detects a receive beamforming vector using codebook-based pre-coding information transmitted by a transmission device in a multi-antenna multi-user communication system.

In accordance with one aspect of an exemplary embodiment of the present invention, there is provided a method for beamforming by a transmission device in a multi-antenna multi-user communication system. The method includes grouping codebook indexes included in a codebook into codebook index combinations, and calculating a sum of transmission rate for each of the codebook index combinations; selecting a codebook index combination with a maximum sum of transmission rate among the calculated sums of transmission rate as an optimal codebook index combination; and transmitting a codebook index corresponding to a particular reception device among codebook indexes included in the optimal codebook index combination, to the particular reception device.

In accordance with another aspect of an exemplary embodiment of the present invention, there is provided a method for beamforming by a transmission device in a multi-antenna multi-user communication system. The method includes grouping codebook indexes included in a codebook into codebook index combinations, and calculating a sum of transmission rate for each of the codebook index combinations; calculating eigenvalues and eigen vectors by performing eigen decomposition on each of the sums of transmission rate calculated separately for the codebook index combinations, selecting a reception device corresponding to an eigen vector with a maximum eigenvalue as a reference reception device, for each codebook index combination, and determining the eigen vector with the maximum eigenvalue as an initial value of a transmit beamforming vector for the reference reception device; and determining, by each of reception devices except for the reference reception device, an eigen vector with a maximum eigenvalue among the eigen vectors except for the eigen vector with the maximum eigenvalue among eigen vectors calculated in a codebook index combination used by the reception device, as a transmit beamforming vector of corresponding reception device.

In accordance with further another aspect of an exemplary embodiment of the present invention, there is provided an apparatus for beamforming in a multi-antenna multi-user communication system. The apparatus includes a controller for grouping codebook indexes included in a codebook into codebook index combinations, calculating a sum of transmission rate for each of the codebook index combinations, and selecting a codebook index combination with a maximum sum of transmission rate among the calculated sums of transmission rate as an optimal codebook index combination; and transmit antennas for transmitting, to a particular reception device, a codebook index corresponding to the particular reception device among codebook indexes included in the optimal codebook index combination.

In accordance with yet another aspect of an exemplary embodiment of the present invention, there is provided an apparatus for beamforming in a multi-antenna multi-user communication system. The apparatus includes a controller for grouping codebook indexes included in a codebook into codebook index combinations, calculating a sum of transmission rate for each of the codebook index combinations, calculating eigenvalues and eigen vectors by performing eigen decomposition on each of the sums of transmission rate calculated separately for the codebook index combinations, selecting a reception device corresponding to an eigen vector with a maximum eigenvalue as a reference reception device, for each codebook index combination, determining the eigen vector with the maximum eigenvalue as an initial value of a transmit beamforming vector for the reference reception device, and determining, by each of reception devices except for the reference reception device, an eigen vector with a maximum eigenvalue among the eigen vectors except for the eigen vector with the maximum eigenvalue among eigen vectors calculated in a codebook index combination used by the reception device, as an initial value of a transmit beamforming vector for corresponding reception device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
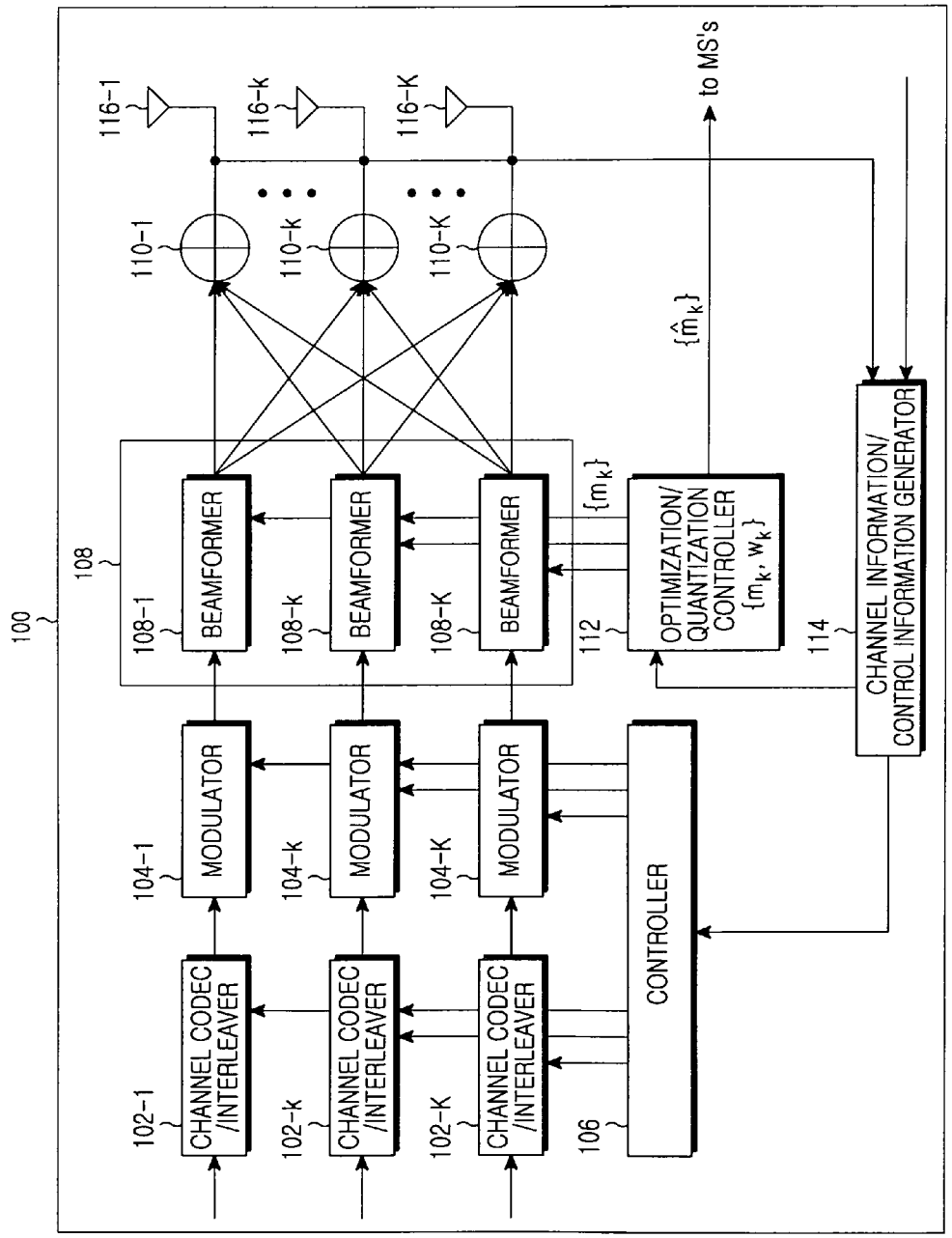
FIG. 1 is a block diagram of a transmission device according to an exemplary embodiment of the present invention.
Figure 2:
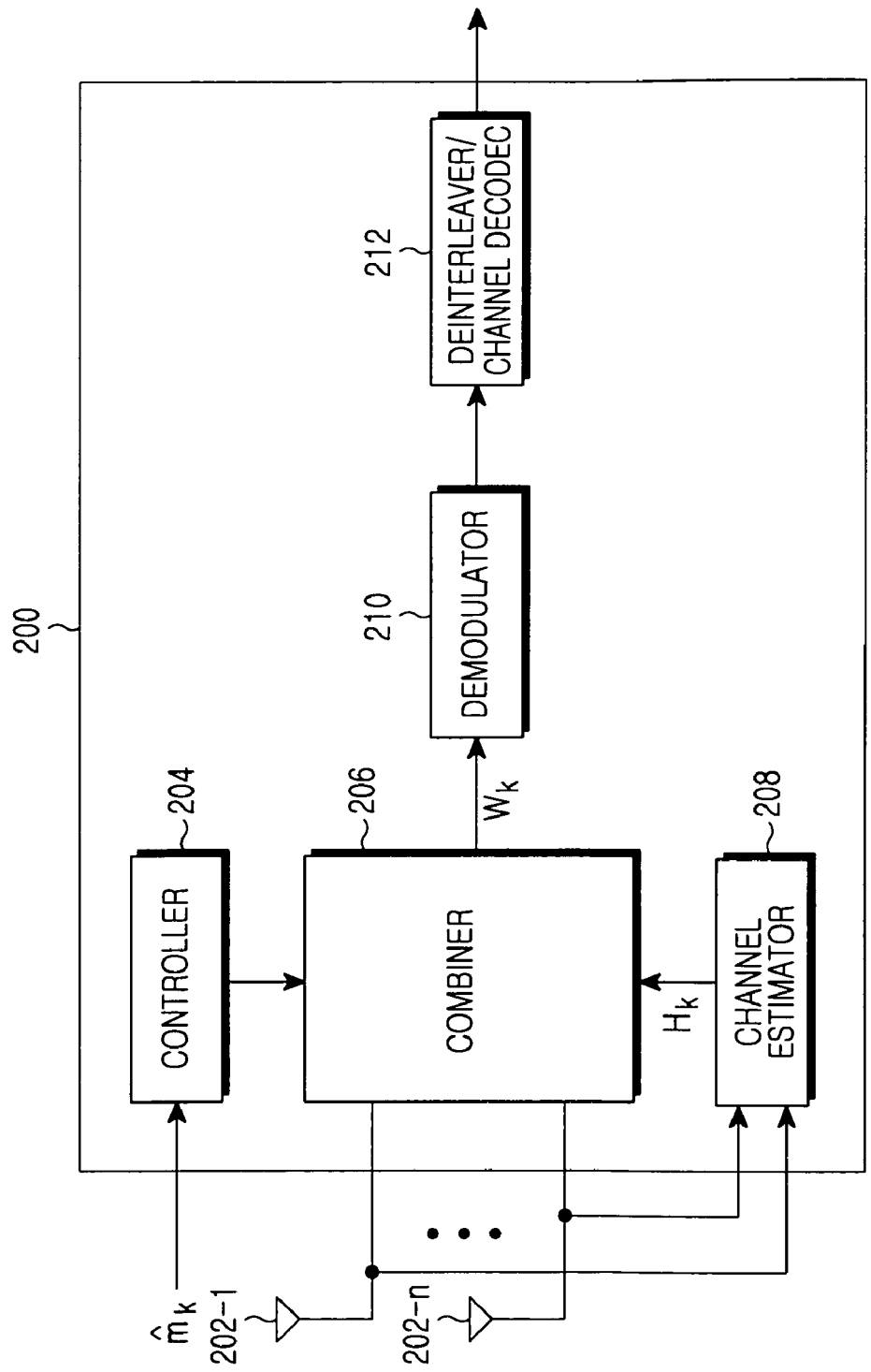
FIG. 2 is a block diagram of a kth reception device according to an exemplary embodiment of the present invention.
Figure 3:
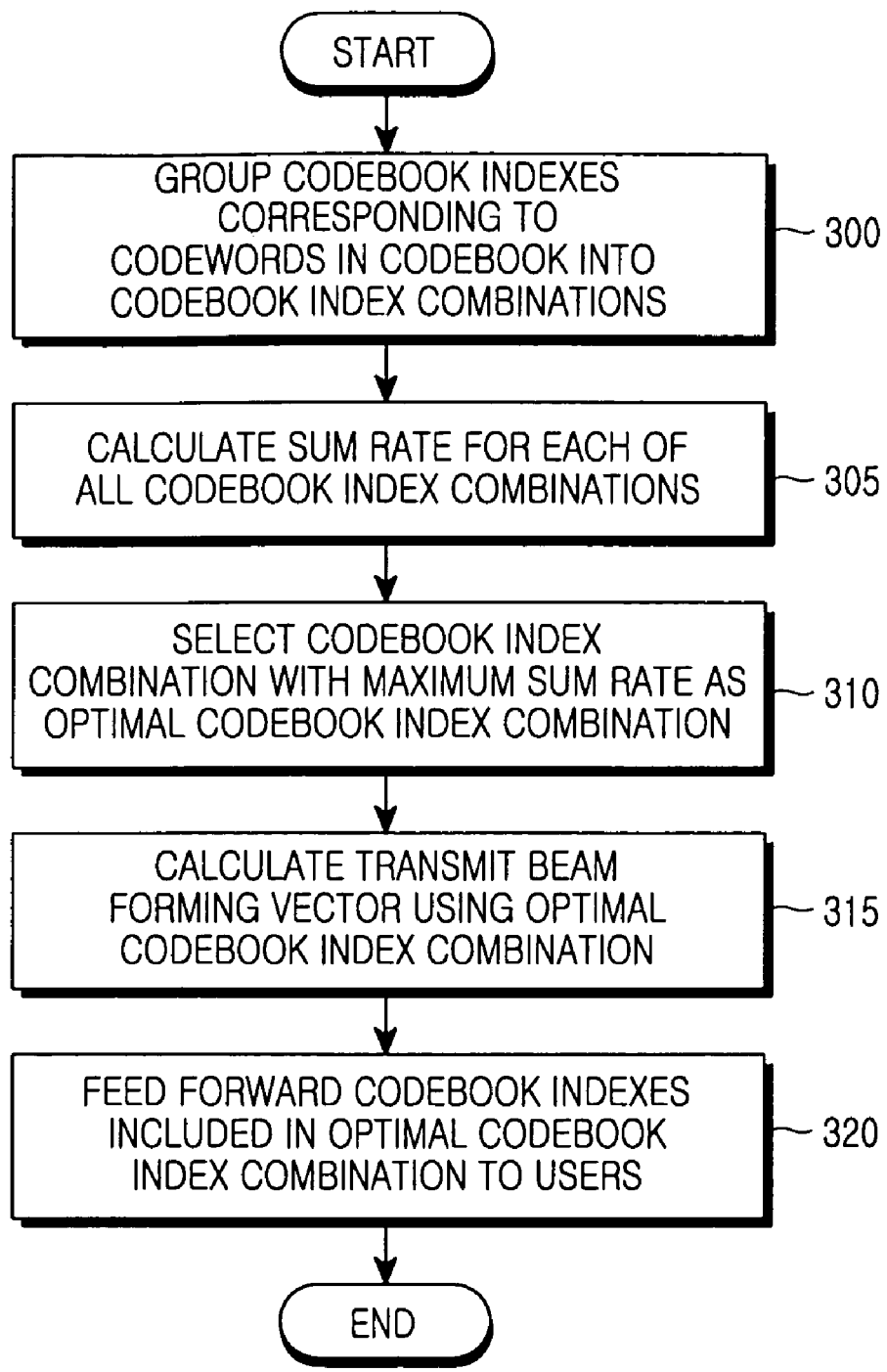
FIG. 3 is a flowchart illustrating an operation of a transmission device according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Embodiments of the present invention will now be described in detail with reference to the figures. In the following description, a detailed description of known functions and configurations incorporated herein has been omitted for clarity and conciseness.

The present invention provides an apparatus and method for beamforming in a multi-antenna multi-user communication system.

Before a description of the present invention is given, it is to be noted that a beamforming method proposed by the present invention should satisfy the following assumptions.

First, a transmission device (e.g., a base station) knows downlink channel information for all reception devices (e.g., mobile stations). The transmission device, when it uses Time Division Duplexing (TDD), may use an uplink sounding channel or receive downlink channel information estimated by a reception device, being fed back through a feedback channel. Though it is assumed herein that a transmission device knows accurate downlink channel information, inaccurate downlink channel information can also be considered without departing from the scope of this disclosure.

In addition, the channel environment concerned is a flat fading environment, and the transmission device and the reception devices use the same codebook. Codewords corresponding to approximate values of transmit beamforming vector values and receive beamforming vector values are mapped to codebook indexes included in the codebook on a one-to-one basis. The approximate value means one representative value obtained by quantizing values included in a predetermined range.

FIG. 1 is a block diagram of a transmission device according to an exemplary embodiment of the present invention.

Referring to FIG. 1, a transmission device 100 includes K transmit antennas 116-1~116-K, K channel codecs/interleavers 102-1~102-K, K modulators 104-1~104-K, K beamformers 108-1~108-K, K adders 110-1~110-K, a controller 106, an optimization/quantization controller 112, and a channel information/control information generator 114.

The channel codecs/interleavers 102-1~102-K each channel-code/interleave transmission signals and deliver them to their associated modulators 104-1~104-K under the control of the controller 106. The modulators 104-1~104-K, under the control of the controller 106, modulate the received channel-coded and interleaved signals using a modulation scheme and deliver them to their associated beamformers 108-1~108-K. Thereafter, the beamformers 108-1~108-K, under the control of the optimization/quantization controller 112, perform beamforming on the signals to be transmitted through the transmit antennas 116-1~116-K, and deliver them to the adders 110-1~110-K. The adders 110-1~110-K add the received beamformed signals and transmit them to reception devices via the transmit antennas 116-1~116-K.

The channel information/control information generator 114 generates channel information and control information by using an uplink sounding channel or receiving downlink channel information estimated by reception devices, being fed back through a feedback channel, and delivers them to the controller 106 and the optimization/quantization controller 112. The optimization/quantization controller 112 calculates transmit/receive beamforming vectors for respective reception devices and transmits the calculated transmit beamforming vectors and codebook indexes that the reception devices need to generate receive beamforming vectors to the reception devices. As an example, a description will be made of an operation wherein the optimization/quantization controller 112 generates transmit/receive beamforming vectors for a reception device corresponding to a $k^{th}$ user among a plurality of reception devices. For convenience, the reception device corresponding to the $k^{th}$ user is referred to as a $k^{th}$ reception device.

FIG. 2 is a block diagram of a $k^{th}$ reception device according to an exemplary embodiment of the present invention.

Referring to FIG. 2, a reception device 200 includes N receive antennas 202-1~202N, a controller 204, a combiner 206, a channel estimator 208, a demodulator 210 and a deinterleaver/channel decodec 212.

The reception device 200 receives a signal transmitted by the transmission device 100, via the receive antennas 202-1~202N.

If the signal that the transmission device 100 transmitted to the $k^{th}$ reception device is represented by $x_k$, the transmit beamforming vector used for the signal transmitted to the $k^{th}$ reception device is indicated by $m_k$, then the transmit beamformed signal for the $k^{th}$ reception device becomes $m_k x_k$. In this case, a signal $y_k$ that the $k^{th}$ reception device has received can be defined as Equation 1:

$$y_k = Q(m_k)^H H_k^H H_k m_k x_k + \quad \text{[Eqn. 1]}$$
$$Q(m_k)^H H_k^H H_k \sum_{l=1, l \neq k}^{K} m_l x_l + Q(m_k)^H H_k^H n_k.$$

In Equation 1, Q( ) denotes a quantization function, K indicates the number of transmit antennas used in the transmission device, and $n_k$ indicates a Gaussian noise vector of the $k^{th}$ reception device.

A Signal Interference & Noise Ratio (SINR) of the signal $y_k$ can be expressed as Equation 2:

$$SINR_k = \frac{|Q(m_k)^H H_k^H H_k|^2}{Q(m_k)^H \left( \sum_{l=1, l \neq k}^{k} H_k^H H_k m_l m_l H_k^H H_k \right) Q(m_k) + Q(m_k)^H H_k^H H_k Q(m_k) \sigma^2} \quad \text{[Eqn. 2]}$$

In addition, it is assumed that the transmission signals that the transmitter transmits to respective reception devices are independent of each other, and their power is normalized.

With reference to FIGS. 1 and 2, a detailed description will now be made of a procedure for generating a receive beamforming vector according to an exemplary embodiment of the present invention. As described above, in the present invention, the transmission device generates a transmit beamforming vector and transmits it along with a codebook index used to generate a receive beamforming vector to a reception device so that the reception device can generate a receive beamforming vector.

For example, when codebook indexes are quantized using $N_b$ bits, the codebook includes $2^{N_b}$ codewords and a codebook C is defined Equation 3:

$$C = \{c_1, c_2, \ldots c_{2^{N_b}}\}. \quad \text{[Eqn. 3]}$$

Since the total number of transmit antennas is K, there are a total of $(2^{N_b})^K$ index combinations of $(i_1, i_2, \ldots, i_K)$.

The optimization/quantization controller 112 generates $Q(m_k)$ by selecting one codeword approximating $m_k$ from among the codewords in the codebook C. Here, $i_k$ indicates a fed-forward (feedforwarded) codebook index for a $k^{th}$ transmit antenna.

An effective channel matrix for fed-forward codebook indexes, selected for respective reception devices, is defined as Equation 4:

$$H_{\mathit{eff}}(i_1, i_2, \ldots, i_K) = \left[ \left( c_{i_1}^{H_{R_1}} \right)^T \ldots \left( c_{i_k}^{H_{R_k}} \right)^T \ldots \left( c_{i_K}^{H_{R_K}} \right)^T \right]^K. \quad \text{[Eqn. 4]}$$

In Equation 4, $(\cdot)^T$ denotes a matrix transpose, $R_k = H_k^H H_k$, and $H_{\mathit{eff}}(i_1, i_2, \ldots i_K)$ indicates an effective channel matrix made by each codebook index combination.

The optimization/quantization controller 112 calculates an initial value $\hat{m}_k$ of a transmit beamforming vector, which corresponds to a codebook index combination for the $k^{th}$ reception device, in accordance with Equation 5 using the effective channel matrix $H_{\mathit{eff}}(i_1, i_2, \ldots i_K)$.

$$\hat{m}_k(i_1, i_2, \ldots i_K) = \frac{\lfloor H_{\mathit{eff}}^+(i_1, i_2, \ldots, i_K) \rfloor_k}{\left\| \lfloor H_{\mathit{eff}}^+(i_1, i_2, \ldots, i_K) \rfloor_k \right\|}. \quad \text{[Eqn. 5]}$$

In Equation 5, $H_{\mathit{eff}}^+(i_1, i_2, \ldots i_K)$ denotes a Pseudo-Inverse (PI) of the matrix $H_{\mathit{eff}}(i_1, i_2, \ldots i_K)$, $[\ ]_k$ denotes a $k^{th}$ vector of the matrix, and $\|\ \|$ represents the norm of a vector.

The optimization/quantization controller 112 calculates an SINR of the $k^{th}$ reception device in accordance with Equation 6, using the $\hat{m}_k$ calculated by Equation 5.

$$SINR_k(i_1, i_2, \ldots, i_k) = \quad \text{[Eqn. 6]}$$
$$\frac{\left| c_{i_k}^H R_k \hat{m}_k(i_1, i_2, \ldots, i_k) \right|^2}{c_{i_k}^H \left( \sum_{l=1, l \neq k}^{k} R_k \hat{m}_k(i_1, i_2, \ldots, i_K) \hat{m}_l^H(i_1, i_2, \ldots, i_K) R_k \right) c_{i_k} + c_{i_k}^H R_k c_{i_k} \sigma^2}$$

For example, with use of the codebook C defined in Equation 3, there are $(2^{N_b})^k$ codebook index combinations, each consisting of K codebook indexes $(i_1, i_2, \ldots, i_k)$. Therefore, the optimization/quantization controller 112 calculates a sum of transmission rate $R_k$ for each codebook index combination using Equation 7:

$$R(i_1, i_2, \ldots, i_K) = \sum_{k=1}^{K} R_k(i_1, i_2, \ldots, i_K) \quad \text{[Eqn. 7]}$$
$$= \sum_{k=1}^{K} \log_2(1 + SINR_k(i_1, i_2, \ldots, i_K)).$$

The optimization/quantization controller 112 selects a codebook index combination with the maximum sum of transmission rate among the sum of transmission rates calculated for the codebook index combinations as an optimal codebook index combination for the $k^{th}$ reception device in accordance with Equation 8:

$$(i_1, i_2, \ldots, i_K) = \arg_{i_1, i_2, \ldots, i_K} \max R(i_1, i_2, \ldots, i_K). \quad \text{[Eqn. 8]}$$

The optimization/quantization controller 112 determines a transmit beamforming vector with inter-user interference minimized, using the selected optimal codebook index combination. In other words, the optimization/quantization controller 112 calculates a transmit beamforming vector for the $k^{th}$ reception device in accordance with Equation 9:

$$m_k = \frac{\lfloor H_{\textit{eff}}^+(\hat{i}_1, \hat{i}_2, \ldots, \hat{i}_K)\rfloor_k}{\|\lfloor H_{\textit{eff}}^+(\hat{i}_1, \hat{i}_2, \ldots, \hat{i}_K)\rfloor_k\|} \quad \text{[Eqn. 9]}$$

Next, the optimization/quantization controller 112 feeds forward a codebook index $\hat{i}_k$ for the $k^{th}$ reception device, included in the optimal codebook index combination, to the $k^{th}$ reception device.

Thereafter, the combiner 206 in the reception device 200 acquires a codeword corresponding to the fed-forward codebook index $\hat{i}_k$ among the codewords in the already known codebook. After that, the combiner 206 calculates a receive beamforming vector in accordance with Equation 10 using the acquired codeword and the channel matrix $H_k$ acquired from the channel estimator 208.

$$w_k = H_k c_{i_k}. \quad \text{[Eqn. 10]}$$

As described above, the transmission device calculates transmit/receive beamforming vectors for each user using the optimal codebook index combination, thereby making it possible to calculate transmit/receive beamforming vectors for each user without the iteration procedure for finding the converged value where interference between transmit antennas is minimized.

FIG. 3 is a flowchart illustrating an operation of a transmission device according to an exemplary embodiment of the present invention.

Referring to FIG. 3, in step 300, the transmission device groups indexes in a codebook that was previously agreed upon with a reception device into combinations of indexes. In step 305, the transmission device calculates sums of transmission rate of the grouped index combinations using Equation 6 and Equation 7. Here, the total number of the index combinations is determined by exponentially multiplying the number of quantized codewords by the number of transmit antennas of the transmission device.

In step 310, the transmission device selects a codebook index combination with the maximum sum of transmission rate among the sum of transmission rates of the index combinations as the optimal codebook index combination for the $k^{th}$ reception device in accordance with Equation 8. In step 315, the transmission device calculates a transmit beamforming vector for the $k^{th}$ reception device in accordance with Equation 9 using the optimal codebook index combination. In step 320, the transmission device feeds forward a codebook index corresponding to the $k^{th}$ reception device, included in the optimal codebook index combination, to the $k^{th}$ reception device.

Thereafter, the $k^{th}$ reception device that has received the codebook index, calculates a receive beamforming vector in accordance with Equation 10 using a codeword corresponding to the codebook index.

Meanwhile, when the number of transmit antennas increases, the number of indexes constituting the index combination also increases, causing an increase in calculation. Therefore, another exemplary embodiment of the present invention provides a method for determining a transmit beamforming vector using an eigen vector, because as transmit beamforming vectors have higher orthogonality, their SINRs increase.

To be specific, an $R_k$ matrix is calculated for each user's reception device in accordance with Equation 7, and eigenvalues and eigen vectors are calculated by performing eigen decomposition on the calculated $R_k$ matrix. Here, a matrix $U_k$ made by gathering eigen vectors of the $R_k$ is generated for each reception device, and eigen vectors in the $U_k$ matrix are reordered in descending order of a level of the eigenvalues. That is, $[U_k]_1$ is an eigen vector having the maximum eigenvalue among the eigen vectors in the $R_k$. A reception device corresponding to $[U_k]_1$ with the maximum value among the $[U_k]_1$ eigen vectors of the reception devices is selected as a reference reception device, and an eigenvalue corresponding to the reference reception device is determined as a transmit beamforming vector. That is, $\overline{m}_1 = [U_1]_1$.

Meanwhile, initial values of transmit beamforming vectors for the remaining users' reception devices are determined as vectors which are most similar to theirs $[U_k]_1$ among the vectors in the $U_1$ except for the vectors in the matrix $U_1$ that have already been allocated to other antennas, in accordance with Equation 11:

$$\hat{p}_k = \arg_{p \in \{1,2,\ldots,K\}-\{selected\ index\}} \max \left| [U_k]_1^H [U_1]_p \right| \quad \text{[Eqn. 11]}$$

$$\overline{m}_k = [U_1]_{\hat{p}_k}.$$

As described above, since an initial value of the transmit beamforming vector is determined for each reception device using Equation 11, a codebook index appropriate to each user can be determined without calculating sums of transmission rate of all codebook index combinations. In other words, the determined codebook index with a codeword approximating the initial value of the transmit beamforming vector is selected from the codebook of Equation 3 as a codebook index for each user.

Therefore, calculating and comparing $(2^{N_b})^K$ SINR sums is replaced by calculating and comparing $K \cdot 2^{N_b}$ SINR sums, thereby contributing to a remarkable reduction in computation.

A transmission rate for each user's codebook index is calculated in accordance with Equation 12:

$$R_k(i_k) = \log_2\left(1 + \frac{\left|c_{i_k}^H R_k \overline{m}_k\right|^2}{c_{i_k}^H \left(\sum_{l=1, l \neq k}^{K} R_k \overline{m}_l \overline{m}_l^H R_K\right) c_{i_k} + c_{i_k}^H R_k c_{i_k} \sigma^2}\right) \quad \text{[Eqn. 12]}$$

Thereafter, the optimization/quantization controller 112 calculates transmit beamforming vectors considering the receive beamforming vectors to minimize the inter-user interference. That is, the optimization/quantization controller 112 selects an optimal codebook index with the maximized transmission rate among the codebook indexes as a codebook index of the $k^{th}$ user, using Equation 13:

$$\hat{i}_k = \arg_{i_k} \max R_k(i_k). \quad \text{[Eqn. 13]}$$

The optimization/quantization controller 112 calculates a transmit beamforming vector for the $k^{th}$ user using the optimal codebook index $\hat{i}_1$ for the $k^{th}$ user, in accordance with Equation 14:

$$m_k = \frac{\lfloor H_{\textit{eff}}^+(\hat{i}_1, \hat{i}_2, \ldots, \hat{i}_K)\rfloor_k}{\|\lfloor H_{\textit{eff}}^+(\hat{i}_1, \hat{i}_2, \ldots, \hat{i}_K)\rfloor_k\|}. \quad \text{[Eqn. 14]}$$

As is apparent from the foregoing description, according to an exemplary embodiment of the present invention, in the multi-antenna multi-user communication system using coordinated beamforming, the transmission device allows a reception device to detect a receive beamforming vector without using the iteration algorithm, thereby preventing a delay in signal transmission caused by calculation of the receive beamforming vector at the transmission device. In addition, the conventional two-step calculation can be reduced to one-step computation, contributing to the simplification and integration of system design and thus preventing performance degradation due to the quantization, compared to the conventional method.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for beamforming by a transmission device in a multi-antenna multi-user communication system, comprising:
    grouping codebook indexes included in a codebook into codebook index combinations, and calculating a sum of transmission rate for each of the codebook index combinations;
    selecting a codebook index combination with a maximum sum of transmission rate among the calculated sums of transmission rate as an optimal codebook index combination; and
    transmitting a codebook index corresponding to a particular reception device among codebook indexes included in the optimal codebook index combination, to the particular reception device,
    wherein codewords corresponding to approximate values of transmit beamforming vector values and receive beamforming vector values are mapped to the codebook indexes included in the codebook on a one-to-one basis, and each of the approximate values represents one representative value selected from values included in a predetermined range.

2. The method of claim 1, further comprising:
    calculating a transmit beamforming vector value for the particular reception device using the optimal codebook index combination so that inter-user interference between multiple reception devices is minimized.

3. The method of claim 1, wherein a codeword corresponding to the codebook index for the particular reception device is used for calculating a receive beamforming vector for the particular reception device.

4. A method for beamforming by a transmission device in a multi-antenna multi-user communication system, comprising:
    grouping codebook indexes included in a codebook into codebook index combinations, and calculating a sum of transmission rate for each of the codebook index combinations;
    calculating eigenvalues and eigen vectors by performing eigen decomposition on each of the sums of transmission rate calculated separately for the codebook index combinations, selecting a reception device corresponding to an eigen vector with a maximum eigenvalue as a reference reception device for each codebook index combination, and determining the eigen vector with the maximum eigenvalue as an initial value of a transmit beamforming vector for the reference reception device; and
    determining, by each of reception devices except for the reference reception device, an eigen vector with a maximum eigenvalue among the eigen vectors except for the eigen vector with the maximum eigenvalue among eigen vectors calculated in a codebook index combination used by the reception device as a transmit beamforming vector of corresponding reception device.

5. The method of claim 4, wherein codewords corresponding to approximate values of transmit beamforming vector values and receive beamforming vector values are mapped to the codebook indexes on a one-to-one basis and each of the approximate values represents one representative value selected from values included in a predetermined range.

6. The method of claim 5, further comprising:
    selecting a codebook index corresponding to an initial value of a transmit beamforming vector of the corresponding reception device from among the codebook indexes; and
    calculating a transmit beamforming vector for the corresponding reception device using the selected codebook index.

7. An apparatus for beamforming in a multi-antenna multi-user communication system, comprising:
    a controller configured to group codebook indexes included in a codebook into codebook index combinations, calculate a sum of transmission rate for each of the codebook index combinations, and select a codebook index combination with a maximum sum of transmission rate among the calculated sums of transmission rate as an optimal codebook index combination; and
    transmit antennas configured to transmit, to a particular reception device, a codebook index corresponding to the particular reception device among codebook indexes included in the optimal codebook index combination,
    wherein codewords corresponding to approximate values of transmit beamforming vector values and receive beamforming vector values are mapped to codebook indexes included in the codebook on a one-to-one basis, and each of the approximate value represents one representative value selected from values included in a predetermined range.

8. The apparatus of claim 7, further comprising:
    a beamformer configured to calculate a transmit beamforming vector value for the particular reception device using the optimal codebook index combination so that inter-user interference between multiple reception devices is minimized.

9. The apparatus of claim 7, wherein a codeword corresponding to the codebook index for the particular reception device is used for calculating a receive beamforming vector for the particular reception device.

10. An apparatus for beamforming in a multi-antenna multi-user communication system, comprising:
    a controller configured to group codebook indexes included in a codebook into codebook index combinations, calculate a sum of transmission rate for each of the codebook index combinations, calculate eigenvalues and eigen vectors by performing eigen decomposition on each of the sums of transmission rate calculated separately for the codebook index combinations, select a reception device corresponding to an eigen vector with a maximum eigenvalue as a reference reception device, for each codebook index combination, determine the eigen vector with the maximum eigenvalue as an initial value of a transmit beamforming vector for the reference reception device, and determine, by each of reception devices except for the reference reception device, an eigen vector with a maximum eigenvalue among the eigen vectors except for the eigen vector with the maximum eigenvalue among eigen vectors calculated in a codebook index combination used by the reception device as an initial value of a transmit beamforming vector for corresponding reception device.

11. The apparatus of claim 10, wherein codewords corresponding to approximate values of transmit beamforming vector values and receive beamforming vector values are mapped to the codebook indexes on a one-to-one basis, and each of the approximate values represents one representative value selected from values included in a predetermined range.

12. The apparatus of claim 11, further comprising:

a beamformer configured to select a codebook index corresponding to a codeword to which an initial value of a transmit beamforming vector for the corresponding reception device approximates, from among the codebook indexes, and calculate a transmit beamforming vector for the corresponding reception device using the selected codebook index.

* * * * *